(12) United States Patent
Grady

(10) Patent No.: US 7,711,168 B2
(45) Date of Patent: May 4, 2010

(54) METHOD FOR TRACKING BLOOD VESSELS

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 868 days.

(21) Appl. No.: 11/582,907

(22) Filed: Oct. 18, 2006

(65) Prior Publication Data

US 2007/0100228 A1  May 3, 2007

Related U.S. Application Data

(60) Provisional application No. 60/728,271, filed on Oct. 19, 2005.

(51) Int. Cl.
*G06K 9/00* (2006.01)
*A61B 6/00* (2006.01)

(52) U.S. Cl. .................... 382/128; 382/274; 378/21

(58) Field of Classification Search ............... 382/107, 382/128, 129, 130, 131, 132, 133, 134, 154, 382/168, 169, 180, 181, 190, 194, 199, 203, 382/232, 256, 257, 274, 276, 285–291, 305; 345/419; 600/458, 410; 378/21.2, 4

See application file for complete search history.

(56) References Cited

U.S. PATENT DOCUMENTS 6,166,740 A * 12/2000 Malzbender ................ 345/419
6,408,201 B1 * 6/2002 Foo et al. .................... 600/410
6,676,606 B2 * 1/2004 Simpson et al. ............. 600/458
7,499,578 B2 * 3/2009 Reeves et al. ............... 382/131

FOREIGN PATENT DOCUMENTS

WO   WO 00/41134   * 7/2000 ............... 5/30

OTHER PUBLICATIONS

Armin Markus Kanitsar: "Advanced Visualization Techniques for Vessel Investigation" Diplomarbeit, Feb. 13, 200!, XP002457324 Institut fOr Computergraphik and Algorithmen, Technische Universitat Wien pp. 37-52.*

Armin Markus Kanitsar: "Advanced Visualization Techniques for Vessel Investigation" Diplomarbeit, Feb. 13, 2001, XP002457324 Institut fOr Computergraphik und Algorithmen, Technische Unlversitat Wien pp. 37-52.

(Continued)

*Primary Examiner*—Seyed Azarian
(74) *Attorney, Agent, or Firm*—Donald B. Paschburg

(57) ABSTRACT

A method for tracking images of a blood vessel wherein user indication of the source and terminus of an image of the blood vessel is provided and the Dijkstra algorithm is used to find the shortest path along the current established from a steady-state circuit model with the current source and sink given by user-placed seeds on the image. Since the method looks at the change in current flow, multiply-connected objects that are either significantly larger or smaller than the vessel will be ignored since the current flow will change dramatically. In contrast, a simple, shortest-path, approach between the source and terminus of the vessel would be unlikely to stay within the vessel if it were to touch another object with similar intensity.

7 Claims, 2 Drawing Sheets

OTHER PUBLICATIONS

Wink 0 et al: "3D MRA Coronary Axis Determination Using a Minimum Cost Path Approach" Magnetic Resonance in Medicine, Academic Press, Duluth, MN, US, vol. 47, No. 6, Jun. 2002, pp. 1169-1175, XP001170393 ISSN: 0740-3194 Section "Minimum Cost Path".

WO 00/41134 A (Koninkl Philips Electronics NV [ML]) Jul. 13, 2000 pp. 1-5.

Deschamps T et al: "Fast extraction of minimal paths in 3D images and applications to virtual endoscopy" Medical Image Analysis, Oxford University Press, Oxofro, GB, vol. 5, 2001, pp. 281-299, XP002904305 ISSN: 1361-8415 Sections 1,2,3.2,4.

WO 02/29717 A (Univ New York [US]; Arie E [US]; Liang Zhengrong [US]; Mar) Apr. 11, 2002 pp. 1-11.

EP 1 057 161 B (Algotec Systems Ltd May 2, 2002 the whole document.

WO 98/11524 A (Univ New York [US]) Mar. 19, 1998 the whole document.

* cited by examiner

METHOD FOR TRACKING BLOOD VESSELS

CROSS REFERENCE TO RELATED APPLICATION

This application claims priority from U.S. Provisional application Ser. No. 60/728,271 filed on Oct. 19, 2005 which is incorporated herein by reference.

TECHNICAL FIELD

This invention relates generally to methods for tracking blood vessels.

BACKGROUND

As is known in the art, real-world blood vessel tracking in 3D is a difficult problem, due to the convoluted path of the vessel, frequent proximity to other vessels or blood-filled objects that produce the same intensity, and the effect of pathology, such as stenosis or thrombosis, that narrows or widens the vessel. More particularly, locating the centerline of a blood vessel, given one point at its origin and another point at its terminus in 3D medical data is difficult due mainly to three factors: (1) Vessels cannot be expected to follow the path of a straight line or any other well-described curve; (2) A vessel frequently twists around, or presses tightly against other vessels or blood-filled objects (of similar intensity), resulting in a loss of boundary definition at those positions (i.e., a weak boundary problem); and (3) Vessel pathology (e.g., stenosis, thrombosis) may significantly constrict or expand the vessel, causing a significant change in shape and/or intensity. In some cases, pieces of the vessel may drop entirely out of the data.

SUMMARY

It is first noted that while there is no physical application of currents to any physical piece of tissue, one may think of the method according to the invention conceptually in this way: If one were to apply a current source at one end of the physical blood vessel and then apply a current sink to the other end, one could measure the current distribution to indicate something about the path taken by the vessel. However, in the context of image analysis, one does not have access to the physical blood vessel, only its image. Therefore, the method according to the invention simulates the application of these currents to the image data, rather than applying the physical currents to the physical blood vessels. How to perform this simulation, calculate the currents and use that distribution to find the vessel comprises the bulk of the method according to the invention.

Thus, in accordance with the present invention, a method is provided for tracking of a blood vessel, the method includes providing user indication of the source and terminus of an image of the blood vessel; and finding the shortest path along a current established from a steady-state circuit model with a current source and a current sink given by user-placed seeds along the image.

In one embodiment, the finding of the shortest path comprises determining change in current flow.

In one embodiment, the finding of the shortest path comprises using the Dijkstra algorithm.

The approach views the image of the blood vessel as a circuit, composed of a lattice of resistors with resistance defined by the difference in image intensities. By asking a user to specify voxels at the source and terminus of the desired vessel, the method views these points as an electrical current between a source and sink and computes the steady-state current distribution across the circuit. By looking for the shortest path between the specified points along the current flows the computed path will have the following properties:

1) The path makes no assumption on the curve of the vessel, and therefore tracks the vessel regardless of how it moves in space.
2) A constriction or expansion of the vessel will not significantly affect the current flow, and therefore the computed path.
3) The path will not enter singly-connected objects through weak boundaries, since no current will pass through these objects.

Since the algorithm looks at the spatial change in current flow, multiply-connected objects that are either significantly larger or smaller than the vessel will be ignored since the current flow will change dramatically. In contrast, a simple, shortest-path, approach between the source and terminus of the vessel would be unlikely to stay within the vessel if it were to touch another object with similar intensity In one embodiment, a method is provided for tracking images of a blood vessel. The method includes: providing a digitized image of a blood vessel comprising a plurality of intensities corresponding to a domain of points on a graph; obtaining two labeled ones of the points on the graph from a user, one of such labeled points being a vessel source, $v_s$, and the one of such labeled points being a vessel terminus, $v_t$; building a weighted graph from the plurality of intensities; determining a potential function; from the weighted graph; obtaining steady-state electrical current flowing through the weighted graph from the determined potential function; obtaining a new set of weights for the graph from the obtained steady-state electrical current; and applying Dijkstra's algorithm to the graph with the new weights to find the shortest path between $v_s$ and $v_t$.

In one embodiment, a method is provided for tracking images of a blood vessel. The method includes: providing a digitized image of a blood vessel comprising a plurality of intensities corresponding to a domain of points on a graph; obtaining two labeled ones of the points on the graph from a user, one of such labeled points being a vessel source, $v_s$, and the one of such labeled points being a vessel terminus, $v_t$; building a weighted graph from the plurality of intensities; determining differences in the intensities between neighboring ones of the plurality of points between the vessel source and the vessel terminus; from the weighted graph; obtaining a new set of weights for the graph from the determined differences; and applying new set of weights to find the shortest path between $v_s$ and $v_t$.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
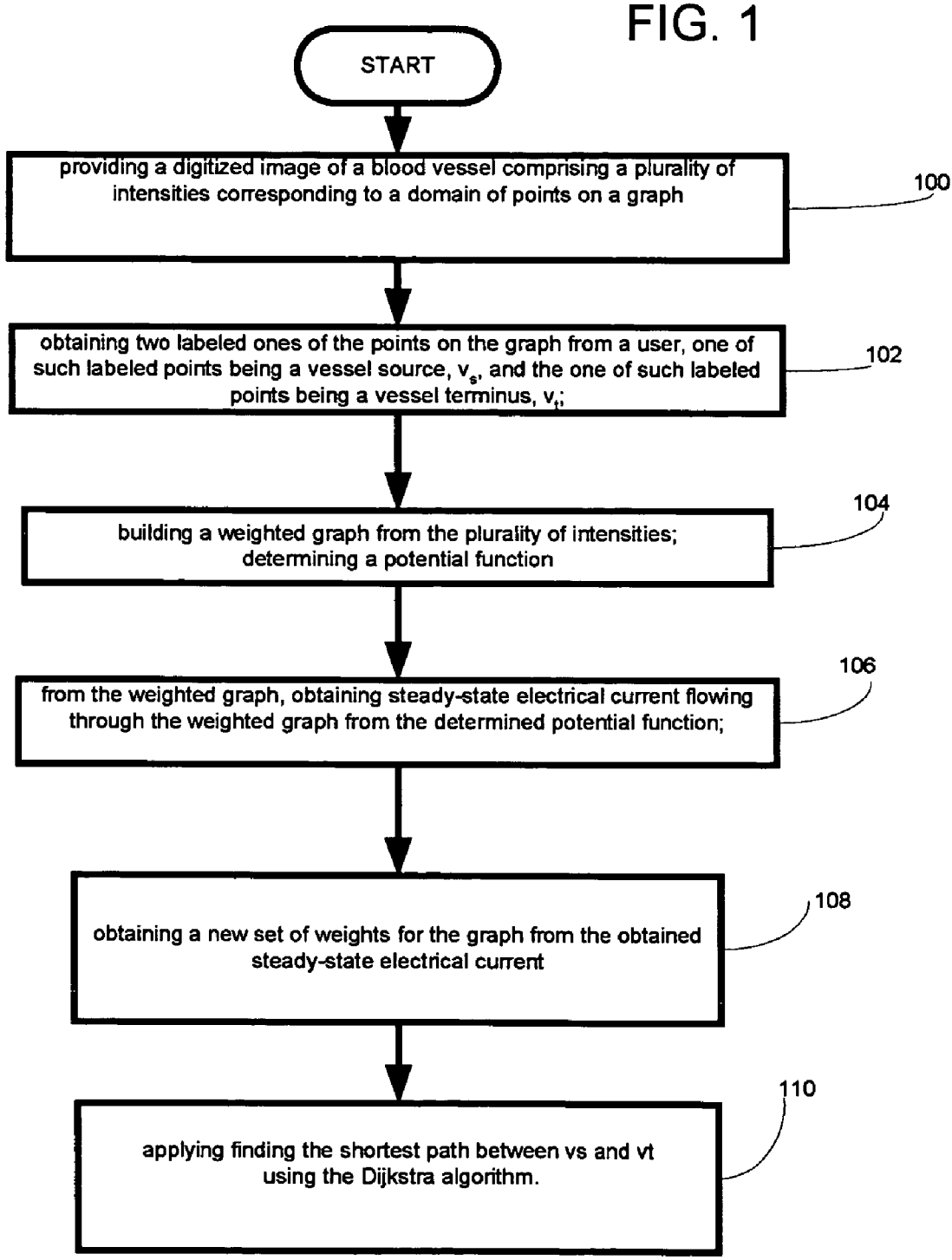
FIG. 1 is a flow diagram of a method for tracking of a blood vessel according to the invention; and, FIG. 2 is a block diagram of a computer system for implementing a blood vessel tracking method according to the invention.

As used herein, the term "image" refers to multi-dimensional data composed of discrete image elements (e.g., pixels for 2-D images and voxels for 3-D images, hereinafter both sometimes being referred to as nodes). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from R3 to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Algorithm Definition

For purposes of algorithm exposition, we begin by defining a precise notion for a graph. The language of graph theory is suitable for problems formulated on a discrete space, such as a digitized image. A graph is a pair $G=(V; E)$ with vertices (nodes) $v \in V$ and edges $e \in E \subseteq V \times V$. An edge, e, spanning two vertices, $v_i$ and $v_j$, is denoted by $e_{ij}$. That is, $e_{ij}$ is an edge on the graph between a point $v_i$ on the graph and another point on the graph, $v_j$.

A weighted graph assigns a value to each edge called a weight. The weight of an edge, $e_{ij}$ is denoted by $w(e_{ij})$ or $w_{ij}$. The degree of a vertex is $d_i = \Sigma w(e_{ij})$ for all edges $e_{ij}$ incident on $v_i$ wherein the summation is taken over all neighboring edges $v_j$.

In the context of 2D image processing, the graph nodes are taken as the image pixels, which lie on a rectangular, 4-connected, grid. Image intensities can be converted into edge weights (i.e., diffusion constants) through many different methods. One exemplary, non-limiting weighting function is the Gaussian weighting function given by $w_{ij} = \exp(-\beta(g_i - g_j)^2)$, where $g_i$ indicates the image intensity at pixel i and $g_j$ the intensity at pixel j. The value of $\beta$ is a free parameter. (A free parameter is selected by the user and is a trade off between how much does the user want to penalize a change in intensity in a weighting function). Another possible weighting function would maximize the entropy of the resulting weights. Although these values may be interpreted as diffusion constants, they shall be referred to herein as weights.

First, we begin by obtaining two labeled ones of the points on the graph from a user, one of such labeled points being a vessel source, $v_s$, and the one of such labeled points being a vessel terminus, $v_t$.

The discrete Laplacian matrix can be defined as:

$$Lv_i v_j = \begin{cases} d_{vi} & \text{if } i = j \\ -w_{ij} & \text{if } v_i \text{ and } v_j \text{ are adjacent nodes} \\ 0 & \text{otherwise} \end{cases} \quad (1)$$

where is $Lv_i, v_j$ is used to indicate that the matrix L is indexed by vertices $v_i$ and $v_j$. One may solve the problem:

$$\min_x Q(x) = x^T L x \quad (2)$$

where x is a function taking one value on every pixel, subject to the constraints that the x values corresponding to $v_s$ and $v_t$ are fixed to $x_s = 1$ and $x_t = 0$.

In the context of potential theory, the quantities x can be regarded as the electrical circuit potentials for a DC steady-state circuit.

Current Flow Computation

As noted above, while there is no physical application of currents to any physical piece of tissue, one may think of the method according to the invention conceptually in this way: If one were to apply a current source at one end of the physical blood vessel and then apply a current sink to the other end, one could measure the current distribution to indicate something about the path taken by the vessel.

The minimization of the above equation is possible via the solution of a system of linear equations, which is known in the literature. For example, see Leo Grady and Gareth Funka-Lea, "Multi-label image segmentation for medical applications based on graph-theoretic electrical potentials," in *Computer Vision and Mathematical Methods in Medical and Biomedical Image Analysis, ECCV 2004 Workshops CVAMIA and MMBIA*, Milan Sonka, Ioannis A. Kakadiaris, and Jan Kybic, Eds., Prague, Czech Republic, May 2004, number LNCS3I17 in Lecture Notes in Computer Science, pp. 230-245, Springer. Leo Grady, "A weighted multigrid solver for computing anisotropic (inhomogeneous) Laplacian systems," U.S. patent application Ser. No. 11/234,977 filed Sep. 26, 2005 Leo Grady, "A lattice-preserving, multigrid method for solving inhomogeneous Dirichlet problems, with applications to image segmentation and filtering," U.S. patent application Ser. No. 11/472,006 filed Jun. 21, 2006 to perform the computation. We first review the system of equations to be solved and then show how to obtain the desired current values from the solution.

Typically, as in Leo Grady and Gareth Funka-Lea, "Multi-label image segmentation for medical applications based on graph-theoretic electrical potentials," in *Computer Vision and Mathematical Methods in Medical and Biomedical Image Analysis, ECCV 2004 Workshops CVAMIA and MMBIA*, the graph is given weights derived from the data using the function $$w_{ij} = \exp(-\beta(g_i - g_j)^2), \quad (3)$$

where $g_i$ indicates the image (volume) intensity at voxel $v_i$ and $g_j$ indicates the image (volume) intensity at voxel $v_j$ and $\beta$ is a free parameter.

One may now solve for a function, x, that minimizes $$\min_x Q(x) = x^T L x$$

where x is a function taking one value on every pixel, subject to the constraints that the x values corresponding to $v_s$ and $v_t$ are fixed to $x_s = 1$ and $x_t = 0$.

Define the $|E| \times |V|$ edge-node incidence matrix as:

$$A_{e_{ij} v_k} = +1 \text{ if } i = k; = -1 \text{ if } j = k; \text{ or } = 0 \text{ otherwise} \quad (4)$$

for every vertex $v_k$ and edge $e_{ij}$, where $e_{ij}$ has been arbitrarily assigned an orientation. As with the Laplacian matrix $A_{e_{ij} v_k}$ is used to indicate that the incidence matrix is indexed by edge $e_{ij}$ and node $v_k$.

The incidence matrix may be used to generate the currents across each edge, y, by producing the voltages, which are transferred to currents via Ohm's Law. Specifically, $$y = CAx, \quad (5)$$

where C is a diagonal matrix of size $|E| \times |E|$ with the edge weights along the diagonal.

Path Finding

The currents are used to generate a path within the vessel by applying a standard Dijkstra shortest-path algorithm (see Alan Gibbons, *Algorithmic Graph Theory*, Cambridge University Press, 1989) to the graph formed by the voxels with edge weights given as a function of the current that passes through each node.

Specifically, a new "image" is formed on the data, r, consisting of the (absolute value of the) current flow through each pixel. Define r as $$r = abs(A^T) abs(y), \quad (6)$$

(where abs indicates the absolute value operation) and the new edge weighting, similar to (1) as $$w_{ij} = (r_i + r_j) \exp{-a(r_i - r_j)^2 - \beta(g_i - g_j)^2}, \quad (7)$$

where a is a free parameter.

This weighting function is useful because it penalizes edges where no current is flowing (using the sum of flows multiplier) but also penalizes edges that have too great a change in flow or a sharp intensity difference. In other words, the goal is to encourage a path that has a large, steady flow.

Dijkstra's algorithm is applied to this new, weighted, graph to find the path through the vessel from the user-indicated source and terminus points.

Summary

The vessel tracking method described above may be summarized as follows while referring to the flow diagram of FIG. 1:

1) Provide a digitized image of a blood vessel comprising a plurality of intensities corresponding to points on a graph (Step 100);
2) Obtain two labeled points from the user, the vessel source, $v_s$, and the vessel terminus, $v_t$. (Step 102);
3) Use (3) to build a weighted graph from the input volume (Step 104);
4) Solve (2) for the potential function (Step 106);
5) Use (5) to obtain the steady-state electrical current flowing through the graph (Step 108);
6) Obtain a new set of weights for the graph, using (6) and (7) (Step 108);
7) Apply Dijkstra's algorithm to the graph with the new weights to find the shortest path between $v_s$ and $v_t$ (Step 110).

Figure 2:
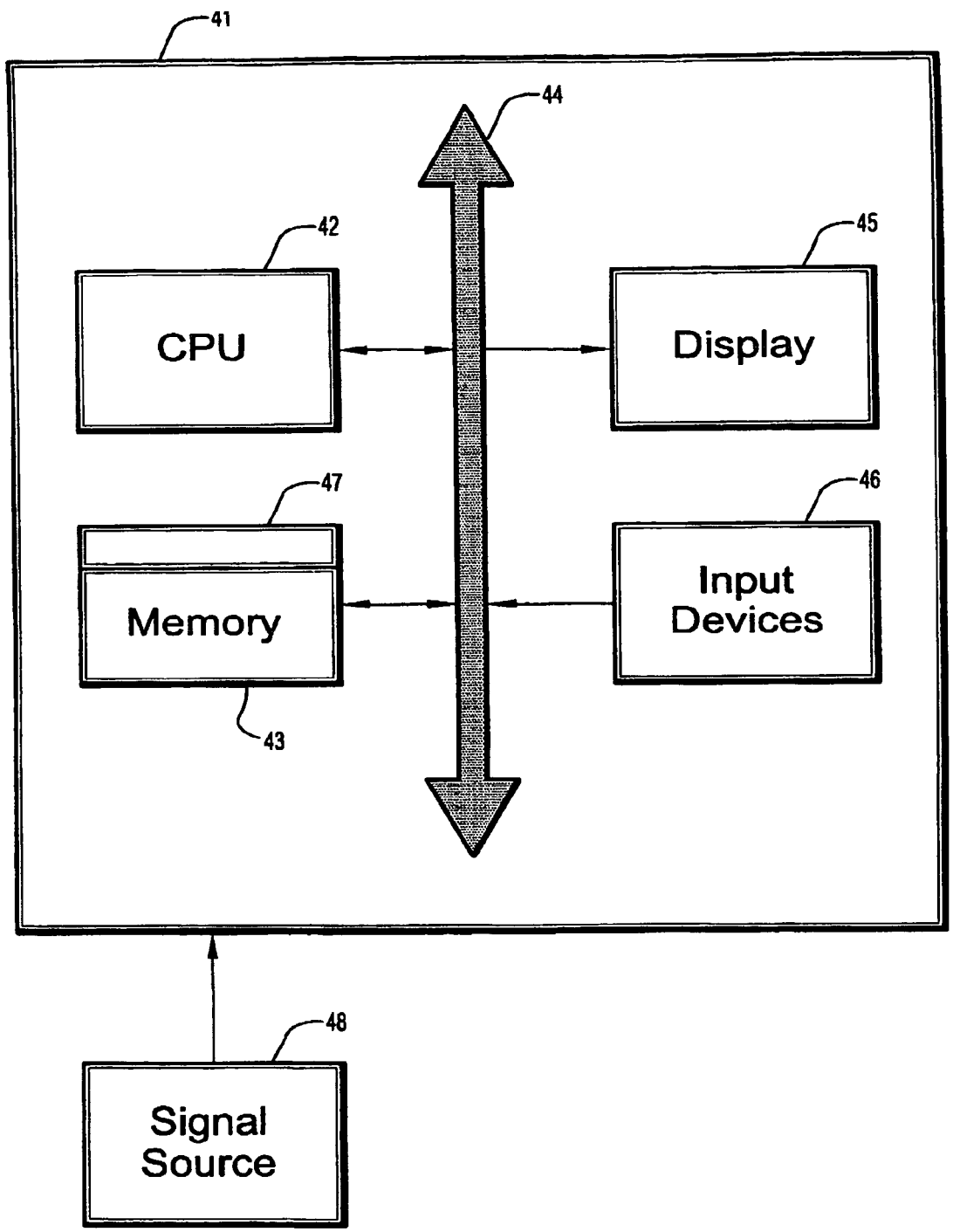

FIG. 2 is a block diagram of an exemplary computer system for implementing an embodiment of the invention. Referring now to FIG. 2, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general-purpose computer system that becomes a specific purpose computer system when executing the routine 47 of the present invention.

The computer system 41 also includes an operating system and microinstruction code. The various processes and functions described herein can either be part of the microinstruction code or part of the application program (or combination thereof) that is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

A number of embodiments of the invention have been described. Nevertheless, it will be understood that various modifications may be made without departing from the spirit and scope of the invention. Accordingly, other embodiments are within the scope of the following claims.

What is claimed is:

1. A method for tracking images of a blood vessel, comprising:
   Providing user indication of the source and terminus of an image of the blood vessel; and finding the shortest path along a current established from a steady-state circuit model with a current source and a current sink given by user-placed seeds on the image;
   wherein the finding of the shortest path comprises determining change in the current.

2. The method recited in claim 1 the finding of the shortest path comprises using the Dijkstra algorithm.

3. A method for tracking images of a blood vessel, comprising:
   providing a digitized image of the blood vessel comprising a plurality of intensities corresponding to a domain of points on a graph;
   obtaining two labeled points on the graph from a user, one of such labeled points being a vessel source, $v_s$, and the one of such labeled points being a vessel terminus, $v_t$;
   building a weighted graph from the plurality of intensities;
   determining a potential function; from the weighted graph;
   obtaining steady-state electrical current flowing through the weighted graph from the determined potential function;
   obtaining a new set of weights for the graph from the obtained steady-state electrical current; and
   applying finding the shortest path between $v_s$ and $v_t$.

4. A method for tracking images of a blood vessel, comprising:
   obtaining a digitized image of the blood vessel comprising a plurality of intensities corresponding to a domain of points on a graph;

obtaining two labeled ones of the points on the graph from a user, one of such labeled points being a vessel source, $v_s$, and the one of such labeled points being a vessel terminus, $v_t$;

determining differences in the intensities between neighboring ones of the plurality of points to build a weighted graph;

obtaining a new set of weights for the graph from the determined differences; and applying a new set of weights to find the shortest path between $v_s$, and $v_t$.

5. The method recited in claim 4 wherein the finding of the shortest path comprises using the Dijkstra algorithm.

6. A method for tracking images of a blood vessel, comprising:

(A) providing a digitized image of the blood vessel comprising a plurality of intensities corresponding to a domain of points on a graph;

(B) obtaining two labeled ones of the points on the graph from a user, one of such labeled points being a vessel source, $v_s$, and the one of such labeled points being a vessel terminus, $v_t$;

(C) building a weighted graph using $w_{ij} = \exp-\beta(g_i-g_j)^2$ where $g_i$ indicates the image intensity at point $v_i$ on the graph and $g_j$ is the image intensity at point $v_j$ on the graph and $\beta$ is a free parameter;

(D) minimizing $Q(x) = x^T L x$, where x is a function taking one value on every one of the points, subject to the constraints that the x values corresponding to $v_s$ and $v_t$ are fixed to 1 and 0 respectively, and L is a matrix and wherein the discrete Laplacian matrix is:

$$L v_i v_j = \begin{cases} d_i & \text{if } i = j \\ -w_{ij} & \text{if } v_i \text{ and } v_j \text{ are adjacent nodes} \\ 0 & \text{otherwise} \end{cases}$$

where $v_i$ is a point on the graph;

where $L_{v_i;v_j}$ is used to indicate that the matrix L is indexed by points $v_i$ and $v_j$ and $d_i$ is the degree of vertex $v_i$, defined as $d_i = \Sigma w(e_{ij})$ for all edges $e_{ij}$ incident on $v_i$;

where $e_{ij}$ is an edge between point $v_i$ and another point on the graph, $v_j$ and wherein the summation is taken over all neighboring edges $v_j$;

using $y = C A_{e_{ij}v_k} x$ where C is a diagonal matrix having zeros off-diagonal and the weights, $w_{ij}$, along the diagonal, where $A_{e_{ij}v_k}$, an incidence matrix, is $A_{e_{ij}v_k} = 1$ if i=k; $=-1$ if j=k or $=0$ otherwise for every vertex $v_k$ and edge $e_{ij}$, where $e_{ij}$ has been arbitrarily assigned an orientation; and $A_{e_{ij}v_k}$ is used to indicate that the matrix is indexed by edge $e_{ij}$ and node $v_k$;

(E) obtaining a new set of weights for the graph, using $r = abs(A_{e_{ij}v_k}^T)abs(y)$, and $w_{ij} = (r_i+r_j)\exp-a(r_i-r_j)^2-\beta(g_i-g_j)^2$, where a is a free parameter;

(F) applying an algorithm to the graph with the new weights to find the shortest path between $v_s$ and $v_t$.

7. The method recited in claim 6 wherein the applied algorithm is Dijkstra's algorithm.

* * * * *